United States Patent
Knechtges et al.

(10) Patent No.: US 10,703,350 B2
(45) Date of Patent: Jul. 7, 2020

(54) ELECTROHYDRAULIC BRAKING-FORCE GENERATION DEVICE FOR AN ELECTROHYDRAULIC MOTOR VEHICLE BRAKING SYSTEM

(71) Applicant: Lucas Automotive GmbH, Koblenz (DE)

(72) Inventors: Carsten Knechtges, Mayen (DE); Josef Knechtges, Mayen (DE); Benedikt Ohlig, Vallendar (DE); Markus Necknig, Waldesch (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 15/576,142

(22) PCT Filed: Apr. 8, 2016

(86) PCT No.: PCT/EP2016/057754
§ 371 (c)(1),
(2) Date: Nov. 21, 2017

(87) PCT Pub. No.: WO2016/184609
PCT Pub. Date: Nov. 24, 2016

(65) Prior Publication Data
US 2018/0134268 A1    May 17, 2018

(30) Foreign Application Priority Data
May 21, 2015    (DE) .......................... 10 2015 006 396

(51) Int. Cl.
*B60T 8/40*    (2006.01)
*B60T 13/74*    (2006.01)
(Continued)

(52) U.S. Cl.
CPC ............ *B60T 13/745* (2013.01); *B60T 7/042* (2013.01); *B60T 13/146* (2013.01);
(Continued)

(58) Field of Classification Search
CPC ...... B60T 7/042; B60T 8/4077; B60T 13/146; B60T 13/745; B60T 13/746; B60T 13/741; B60T 13/662; B60T 2220/04
See application file for complete search history.

(56) References Cited

U.S. PATENT DOCUMENTS

| | | | |
|---|---|---|---|
| 5,609,399 A | | 3/1997 | Feigel et al. |
| 8,424,976 B2 * | | 4/2013 | Dinkel .................... B60T 7/042 188/359 |

(Continued)

FOREIGN PATENT DOCUMENTS

| | | |
|---|---|---|
| DE | 4310061 A1 | 9/1994 |
| DE | 102006006604 A1 | 9/2006 |

(Continued)

OTHER PUBLICATIONS

German Search Report, Application No. DE 102015006396.0, dated Mar. 9, 2016.

(Continued)

*Primary Examiner* — Thomas W Irvin
(74) *Attorney, Agent, or Firm* — MacMillan, Sobanski & Todd, LLC

(57) ABSTRACT

The present invention relates to an electrohydraulic braking-force generation device and to a method for operating an electrohydraulic braking-force generation device. The electrohydraulic braking-force generation device comprises: a power transmission assembly that is coupled to a brake pedal; a brake cylinder assembly that is to be actuated by the power transmission assembly, the brake cylinder assembly having a first cylinder-piston assembly and said first cylin- (Continued)

der-piston assembly being designed to be fluidically coupled to at least one brake circuit; and a brake booster assembly comprising a second cylinder-piston assembly and at least one electromechanical actuator. The brake booster assembly is configured to apply hydraulic pressure to the brake cylinder assembly in order to boost the braking power and the power transmission assembly is configured to actuate the brake cylinder assembly, in each operating mode of the braking-force generation device, by means of a relative movement.

12 Claims, 3 Drawing Sheets

(51) Int. Cl.
  *B60T 13/14* (2006.01)
  *B60T 13/66* (2006.01)
  *B60T 7/04* (2006.01)

(52) U.S. Cl.
  CPC .......... *B60T 13/662* (2013.01); *B60T 13/746* (2013.01); *B60T 8/4077* (2013.01); *B60T 2220/04* (2013.01)

(56) References Cited

U.S. PATENT DOCUMENTS

| | | | |
|---|---|---|---|
| 9,199,618 B2* | 12/2015 | Drumm | B60T 1/10 |
| 9,227,611 B2 | 1/2016 | Gilles | |
| 9,586,487 B2* | 3/2017 | Knechtges | B60T 7/042 |
| 9,956,943 B2* | 5/2018 | Alford | B60T 8/4081 |
| 10,029,663 B2* | 7/2018 | Knechtges | B60T 8/4077 |
| 2008/0265665 A1* | 10/2008 | Drumm | B60T 8/4077 303/116.4 |
| 2010/0263367 A1 | 10/2010 | Drumm | |
| 2011/0291470 A1* | 12/2011 | Drumm | B60T 1/10 303/3 |
| 2013/0234501 A1 | 9/2013 | Leiber | |
| 2015/0344013 A1 | 12/2015 | Knechtges et al. | |
| 2017/0001615 A1* | 1/2017 | Adler | B60T 7/042 |

FOREIGN PATENT DOCUMENTS

| | | |
|---|---|---|
| DE | 102010034696 A1 | 2/2012 |
| DE | 102011085273 * | 5/2012 |
| DE | 102011016940 A1 | 10/2012 |
| DE | 102011086986 A1 | 5/2013 |
| DE | 102014003641 * | 9/2015 |
| WO | 2012/062393 A1 | 5/2012 |
| WO | 2012/152352 A1 | 11/2012 |
| WO | 2014/095286 A1 | 6/2015 |

OTHER PUBLICATIONS

PCT International Search Report and the Written Opinion, Application No. PCT/EP2016/057754 filed Apr. 8, 2016, dated Oct. 17, 2016.

PCT International Preliminary Report on Patentability, Application No. PCT/EP2016/057754 filed Apr. 8, 2016, dated May 9, 2017.

* cited by examiner

ELECTROHYDRAULIC BRAKING-FORCE GENERATION DEVICE FOR AN ELECTROHYDRAULIC MOTOR VEHICLE BRAKING SYSTEM

CROSS-REFERENCE TO RELATED APPLICATIONS

This application is the National Phase of International Application PCT/EP2016/057754 filed Apr. 8, 2016, which designated the U.S. That International Application was published in English under PCT Article 21(2) on Nov. 24, 2016 as International Publication Number WO 2016/184609A1. PCT/EP2016/057754 claims priority to German Application No. 10 2015 006 396.0 filed May 21, 2015. Thus, the subject nonprovisional application also claims priority to German Application No. 10 2015 006 396.0 filed May 21, 2015. The disclosures of both applications are incorporated herein by reference.

BACKGROUND OF THE INVENTION

The present disclosure relates generally to the field of brake power generating apparatuses or brake booster apparatuses. Specifically, an electrohydraulic brake power generating apparatus for a motor vehicle brake system is described.

Various electrohydraulic brake systems are known from the prior art and disclosed, for example, in WO 2012/062393 A1 and in WO 2012/152352 A1. These motor vehicle brake systems work by the "brake-by-wire" principle. This means that a hydraulic pressure is built up at the wheel brakes independently of the foot force. The electrohydraulic brake systems taught therein have various brake circuits, which are controllable by means of hydraulic fluid, or a hydraulic fluid pressure. Known hydraulic pressure generators further comprise a cylinder-piston device for generating hydraulic pressure and an electromechanical actuator which acts on the piston of the cylinder-piston device. The electromechanical actuator is arranged downstream of the cylinder-piston device and is coupled directly with the piston of the cylinder-piston device. The piston can thus be operated directly via the actuator, whereby a hydraulic pressure can be built up at the wheel brakes independently of the foot force. The cylinder-piston device is further coupled via a power transmission device with a pedal interface arranged downstream of the cylinder-piston device and the electromechanical actuator. In the case of emergency operation of the brake system, the power transmission device allows the cylinder-piston device to be coupled mechanically with the brake pedal interface so that the piston of the cylinder-piston device can be operated by means of the foot force present at the pedal interface (push-through operation).

WO 2014/95 286 A1 describes an electrohydraulic vehicle brake system having two actuators which are so configured that they are able to actuate a main cylinder piston independently of one another (separately or together). A decoupling device is functionally provided between a brake pedal and a power transmission element. The decoupling device allows the brake pedal to be selectively uncoupled from the piston arrangement in the main cylinder. Within the scope of normal service braking, both the decoupling device and the simulation device are activated, while they are deactivated in emergency operation.

DE 10 2011 016 940 A1 describes a hydraulic brake system with brake-by-wire activation, in which at least one operating piston is displaceably guided in a hydraulic operating piston chamber and can be shut off hydraulically by means of an operating piston valve arrangement in order to block the at least one operating piston. The operating piston valve arrangement is closed in a first operating position, which is present in the case of a proper operating condition of the brake system, on operation of the force input member to shut off the hydraulic operating piston chamber, and is open in a second operating position, which is present in the case of an improper operating condition of the brake system, on operation of the power input member to release the hydraulic operating piston chamber.

An electrohydraulic brake power generating apparatus for electrohydraulic motor vehicle brake systems is to be provided. The electrohydraulic brake power generating apparatuses are further to occupy as little installation space as possible in the motor vehicle and be inexpensive to produce.

SUMMARY OF THE INVENTION

The electrohydraulic brake power generating apparatus for an electrohydraulic motor vehicle brake system comprises a power transmission device which is coupled with a brake pedal, a brake cylinder device to be operated by the power transmission device, and a brake booster device. The brake cylinder device has a first cylinder-piston device. The brake booster device comprises a second cylinder-piston device and at least one electromechanical actuator. The brake booster device is adapted to apply a hydraulic pressure on the brake cylinder device for brake boosting.

The power transmission device is adapted to operate the brake cylinder device by means of a relative movement in each operating condition of the brake power generating apparatus.

The expression "in each operating condition" is here to be understood as meaning that, regardless of whether the brake power generating apparatus, or the brake system, is operating in normal operation or in emergency operation, the brake cylinder device is operated via a relative movement of the power transmission device relative to the brake cylinder device. When the brake pedal is operated to generate hydraulic pressure, the brake cylinder device can first always be controlled by the power transmission device before the brake booster device provides a hydraulic pressure for brake boosting corresponding to the operation of the brake pedal.

Unlike in the electrohydraulic brake systems known from the prior art, in the proposed brake power generating apparatus the brake cylinder device, which serves to generate the hydraulic pressure necessary for application to the brake circuits, is not decoupled from the brake pedal, or from the operating power exerted on the brake pedal by a driver. In the proposed electrohydraulic brake power generating apparatus, the brake cylinder device can be operated directly on operation of the brake pedal by a driver by means of the power transmission device coupled with the brake pedal. Various components necessary for decoupling the brake pedal from the brake cylinder device, such as hydraulic brake power simulators, special pedal interfaces and various hydraulic circuits, can thereby be saved. The proposed electrohydraulic brake power generating apparatus is thus less expensive to produce and can be designed to be space-saving.

The power transmission unit and the brake cylinder device can be so coupled that at least some of the power exerted on the power transmission device by means of the brake pedal can be transmitted to the first cylinder-piston device in each operating condition.

The brake cylinder device can have at least one reaction element. The at least one reaction element can be contacted by the power transmission device for operation of the brake cylinder device. At least some of the power exerted on the power transmission device via the brake pedal can be applied to the at least one reaction element by the power transmission device. In other words, at least some of the brake power exerted by the brake pedal on the power transmission device is transmitted to the at least one reaction element. The at least one reaction element can be so designed that the behavior of the at least one reaction element can be compared in an idealized manner with the behavior of a hydraulic fluid. The at least one reaction element can be produced, for example, from an elastomer material and be disk-shaped. The at least one reaction element can be provided between the first cylinder-piston device and the power transmission device. The brake cylinder device can be operated by the power transmission device via the at least one reaction element.

The at least one reaction element can cooperate with a plunger on the power transmission device. The plunger can transmit the power exerted on the power transmission device by the brake pedal to the at least one reaction element. The plunger can thereby dip into or penetrate the at least one reaction element with its operating surface, whereby the material of the reaction element is displaced. The first cylinder-piston device can then in turn be operated via the at least one reaction element. The plunger has an operating surface with a predetermined contour. The predetermined contour of the plunger makes it possible to ensure that the first cylinder-piston device can quickly be operated by means of the power transmission device. The at least one reaction element can also provide a pedal restoring power which is directed against the power exerted on the brake pedal by the driver. Accordingly, the at least one reaction element also serves to convey an agreeable pedal feel to the driver when he operates the brake pedal.

The first cylinder-piston device can have at least one piston. The at least one piston can be coupled with the power transmission device. The first cylinder-piston device can have at least two hydraulic chambers defined by the first cylinder and the at least one piston. A first hydraulic chamber can be defined by a first end face of the first piston and the cylinder. A second hydraulic chamber can be defined by a second end face, opposite the first end face, of the first piston and the cylinder. The first chamber can be fluidly coupled with the second cylinder-piston device. The at least one second hydraulic chamber can further be fluidly couplable with at least one brake circuit of the brake system. The first chamber can be configured to receive the hydraulic fluid displaced from the second cylinder-piston device. The first piston can thereby be displaced towards the second hydraulic chamber, whereby the hydraulic fluid received in the second hydraulic chamber can be displaced into the brake circuits. The at least one reaction element can be provided on the piston of the first cylinder-piston device. The power transmission device can be displaceable relative to the piston of the first cylinder-piston device in order to be able to operate the first cylinder-piston device.

The second cylinder-piston device of the brake booster device can comprise at least one second piston. An electromechanical actuator can act on the second piston of the second cylinder-piston device. The brake booster device can provide a hydraulic pressure or brake-boosting pressure, generated in the second cylinder-piston device upon operation of the electromechanical actuator, for operation of the first cylinder-piston device.

The at least one piston of the first cylinder-piston device can be so configured that it is able to receive the at least one reaction element and at least a portion of the at least one power transmission device. A very short installation length of the brake power generating apparatus can thus be achieved, so that the brake power generating apparatus occupies little installation space in the vehicle.

The at least one piston can have a recess. The at least one piston can be U-shaped in cross-section. The at least one reaction element can rest on the bottom of the U-shape. The at least one piston receives a portion of the power transmission device in such a manner that the power transmission device is able to act directly and immediately on the reaction element for operation of the brake cylinder device, or of the first cylinder-piston device. For that purpose, the power transmission device can be so received in the first piston that the power transmission device is able to perform a relative movement relative to the first piston. The power transmission device can have a piston to be coupled with the brake pedal, and a cylinder in which the piston can be displaced via the brake pedal, or a power input member. The cylinder of the power transmission device can be connected to the piston of the first cylinder-piston device. An operating element can be attached to the cylinder via at least one spring means. When the brake pedal is operated, the at least one spring element can be (completely) compressed by a relative movement between the operating element and the cylinder, before the cylinder can be moved together with the piston of the first cylinder-piston device for hydraulic pressure generation in the first cylinder-piston device.

The brake cylinder device can have at least one brake booster piston. The at least one brake booster piston can be fluidly coupled with the brake booster device. For example, the brake booster piston can be connected to the brake booster device via a fluid path.

The at least one brake booster piston can be adapted to transmit a boosting power generated by the brake booster device to the first cylinder-piston device. The at least one brake booster piston can be received in a cylinder separate from the first cylinder-piston device. The at least one brake booster piston, together with its associated cylinder, can define a hydraulic chamber to which hydraulic pressure generated by the brake booster device can be applied. That hydraulic pressure can displace the at least one brake booster piston in its associated cylinder and thus apply hydraulic pressure for brake boosting to the first cylinder-piston device.

The at least one brake booster piston can receive at least a portion of the power transmission device in such a manner that a relative movement between the power transmission device and the brake booster piston is possible. By means of a relative movement of the power transmission device relative to the at least one brake booster piston, the power transmission device can apply at least some of the brake power generated by a driver to the reaction element. The power transmission device can be supported on the brake booster piston via at least one spring means.

The power transmission device can be biased into its starting position. The biasing power can be provided, for example, by at least one spring arrangement or at least one spring element. The spring arrangement can serve to provide a restoring power for the brake pedal, which acts against an operating power applied to the brake pedal by a driver. By means of this spring arrangement, an agreeable pedal feel can be conveyed to the driver when he operates the brake. The brake cylinder device can have at least a first bearing flange and the power transmission device can have at least a second bearing flange. The at least one spring arrangement for biasing the power transmission device into its starting position can extend between the first and second bearing flanges. At the least the second bearing flange and a portion of the at least one spring arrangement can be situated in the passenger compartment of a vehicle. At least a portion of the at least one spring arrangement can be enclosed by a concertina-type cover. The concertina-type cover can also extend between the first and second bearing flanges.

The brake power generating apparatus can have at least one sensor arrangement. The at least one sensor arrangement can at least be adapted to enable the necessary boosting of the brake power exerted on the brake pedal to be determined. On the basis of the measured values of the at least one sensor arrangement, the boosting power that must be provided by the brake booster device is determined. The at least one brake booster device then generates the corresponding boosting power, or the corresponding hydraulic pressure, which can further be applied to the first cylinder-piston device following the initial, or direct, operation by the driver. The sensor arrangement can be formed, for example, by one or more displacement sensors. The sensor arrangement can have two sensors, for example, which are provided on the brake power generating apparatus in such a manner that they are displaceable relative to one another. The amount of relative movement between the two sensors can constitute a parameter on the basis of which the necessary brake boosting can be determined. The sensor arrangement can likewise be formed by a sensor on the power transmission device and a sensor which detects the position of the actuator.

The at least one sensor arrangement can be directly coupled with at least one control unit of the brake power generating apparatus. The sensor arrangement can be located in proximity to the brake cylinder device or to the power transmission device. The sensors of the at least one sensor arrangement can be so coupled with the at least one control unit that the sensors are able to input their measured values directly into the control unit. Furthermore, the sensor arrangement and the control unit can be so configured that the sensors are able to transmit their measured values directly to a circuit board of the control unit. The sensors can be integrated into the at least one control unit. On operation of the brake, the sensors can be moved, for example, along the control unit and produce magnetic fields which can be directly detected and processed by the control unit. Further installation space can thus be saved, since the evaluation of the measured values of the sensors can take place directly, or in an integrated manner, in the control unit. Furthermore, a separate housing for the sensors is not required in this case, because the sensors are integrated into the control unit.

The at least one control unit can further serve to electrically control the electromechanical actuator of the brake booster device. The control unit can be adapted to evaluate the parameters detected by the sensor arrangement and to deliver corresponding control commands for the actuator. On the basis of the evaluated sensor signals, the control unit can correspondingly control the electromechanical actuator in order to generate a brake-boosting pressure in the brake booster device.

The hydraulic pressure provided by the brake booster device can depend on a detected intention of the driver to brake or on the commands of a vehicle dynamics management program. The intention to brake can be detected by the at least one sensor arrangement and be converted by the at least one control unit into corresponding operating signals for the electromechanical actuator. The intention to brake can be determined, for example, by detecting a brake pedal path and/or an operating power acting on the brake pedal. The vehicle dynamics management program, such as, for example, an antilock brake system (ABS), a traction control system (ASR), an electronic stability program (ESP), also referred to as vehicle stability control (VSC), or an adaptive cruise control system (ACC), can be lodged in the electronic control unit.

The proposed solution further includes an electrohydraulic motor vehicle brake system having an electrohydraulic brake power generating apparatus of the type described above.

A method for operating an electrohydraulic brake power generating apparatus is further proposed. The electrohydraulic brake power generating apparatus comprises a power transmission device which is coupled with a brake pedal, a with the power transmission device for operating a brake cylinder device, wherein the brake cylinder device has a first cylinder-piston device, wherein the first cylinder-piston device is to be fluidly coupled with at least one brake circuit, a brake booster device which comprises a second cylinder-piston device and at least one electromechanical actuator, wherein the brake booster device is adapted to apply a hydraulic pressure to the brake cylinder device for brake boosting, and wherein the power transmission device is adapted to operate the first cylinder-piston device by means of a relative movement relative to the brake cylinder device in each operating condition of the brake power generating apparatus. The method comprises the following step:
operating the first brake cylinder device by means of a relative movement between the power transmission device and the brake cylinder device, wherein the operation of the brake cylinder device takes place by means of the relative movement between the power transmission device and the brake cylinder device in each operating condition of the brake power generating apparatus.

Parameters can further be detected which are suitable for determining the brake boosting. These parameters can include inter alia a power exerted by the driver on the pedal and/or the pedal path of the brake pedal. On the basis of the detected parameters, a hydraulic pressure for brake boosting can be generated by means of the brake booster device. The hydraulic pressure prevailing in the first cylinder-piston device can be boosted by the hydraulic pressure provided by the brake booster device.

Further objects, features, advantages and possible applications will become apparent from the following description of exemplary embodiments, which are not to be interpreted as limiting, with reference to the accompanying figures. In the figures, all the features which are described and/or depicted show the subject-matter disclosed herein on their own or in any desired combination, also independently of their grouping in the claims or their references. The dimensions and proportions of the components shown in the figures are not necessarily to scale; they can differ from those shown in embodiments for implementation.

DETAILED DESCRIPTION OF THE PREFERRED EMBODIMENT

Figure 1:
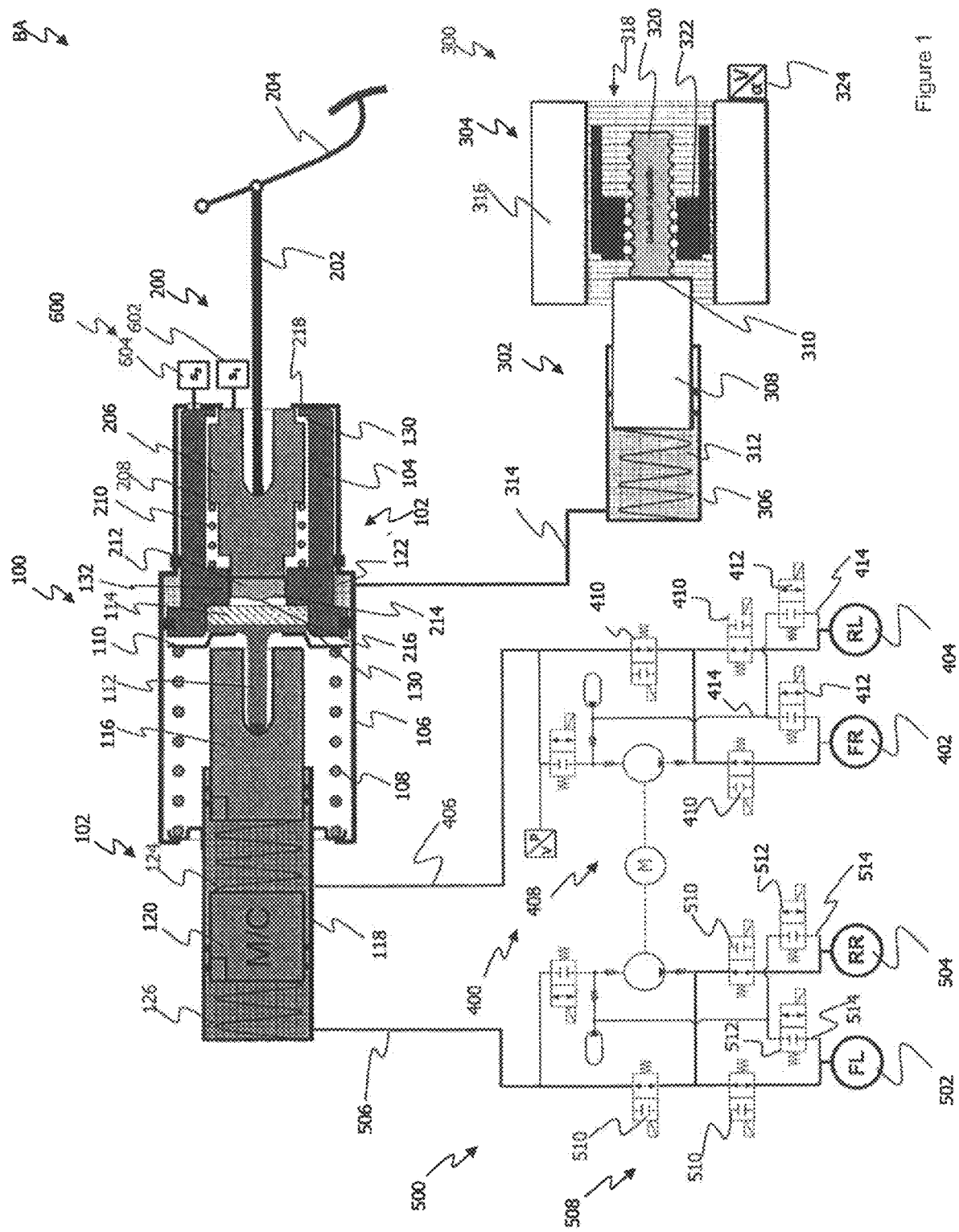
FIG. 1 shows a first exemplary embodiment of the proposed brake power generating apparatus installed in a brake system.

FIG. 1 shows a first exemplary embodiment of an electrohydraulic brake power generating apparatus 1000 for a motor vehicle brake system BA.

The brake power generating apparatus 1000 comprises a brake cylinder device 100, a power transmission device 200, and a brake booster device 300. The brake cylinder device 100 is fluidly coupled with two brake circuits 400 and 500. The brake power generating apparatus 1000 further comprises an electronic control unit, or ECU for short (not shown), for controlling the assembly groups 100, 200, 300 and the valves of the brake system BA.

The structure and functioning of the brake cylinder device 100 is described in greater detail hereinbelow.

The brake cylinder device 100 comprises a first cylinder-piston device 102 and a brake booster piston 104 which is displaceably received in a first cylinder 106. The cylinder 106 receives a spring element 108, which biases the brake booster piston 104, a bearing element 110 on which the spring element 108 bears, and a coupling element 112 into their starting positions. The spring element 108 also serves to provide a pedal restoring power. This is intended to convey an agreeable pedal feel to a driver. The coupling element 112 couples a reaction element 114 with the first cylinder-piston device 102. The reaction element 114 will be discussed in greater detail in the further description.

The first cylinder-piston device 102 comprises a first piston 116 (called the primary piston hereinbelow) which is displaceably received in a second cylinder 118, and a second piston 120 (called the secondary piston hereinbelow) which is displaceably received in the second cylinder 118. The two pistons 116, 120 can each be coupled with a spring device, which spring devices are configured to return the two pistons 116, 120 to their starting positions in the unoperated state.

The primary piston 116 and the secondary piston 120 are arranged one behind the other in the second cylinder 118 (tandem principle). The brake booster piston 104, the primary piston 116 and the secondary piston 120 define three hydraulic chambers 122, 124, 126 in the cylinders 106 and 118. A first hydraulic chamber 122 is defined by the brake booster piston 104 with its piston surface that is remote from the first cylinder-piston device 102 and a cylinder bottom of the first cylinder 106. A second hydraulic chamber 124 is defined by an end face of the primary piston 116 facing in the operating direction for hydraulic pressure generation (left-hand end face of the primary piston in FIG. 1) and by an end face of the secondary piston 120 opposite to the operating direction for hydraulic pressure generation. Furthermore, a third hydraulic chamber 126 is defined by an end face of the secondary piston 120 facing in the operating direction for hydraulic pressure generation (left-hand end face of the secondary piston 120 in FIG. 1) and a second cylinder bottom. The second hydraulic chamber 124 and the third hydraulic chamber 126 are thus separated from one another by the displaceably received secondary piston 120.

The second hydraulic chamber 124 is fluidly coupled with the first brake circuit 400, and the third hydraulic chamber 126 is fluidly coupled with the second brake circuit 500.

The first cylinder-piston device 102 is coupled with the reaction element 114 via the coupling element 112. In the starting position of the brake cylinder device 100, the reaction element 114 is received in an opening 130 in the brake booster piston 104. The opening 130 extends through the brake booster piston 104 and likewise serves to receive the power transmission device 200. The opening 130 of the brake booster piston 104 has a step 132 on which the power transmission device 200 can bear. The step 132 reduces the diameter of the opening 130. The reaction element 114 abuts one side of the step 132 in the unoperated state of the brake power generating apparatus 1000, while the power transmission device 200 bears against the side remote from the reaction element 114.

The power transmission device 200 has a power input member 202 which is coupled with the brake pedal 204. The power input member 202 is connected to a piston 206. A shoulder 208 is formed on the piston 206. A spring element 210 is provided between the shoulder 208 and the step 132 of the brake booster piston 104. On operation of the brake pedal 204, the spring element 210 allows a relative movement between the power transmission device 200 and the brake booster piston 104. Furthermore, a relative movement between the power transmission device 200 and the brake cylinder device 100 is also made possible by the spring element 210. During this relative movement for operation of the first cylinder-piston device 102, the spring element 210 is compressed. A plunger 212 is arranged on the piston 206, which plunger serves to operate the reaction element 114, or the reaction disk 114. The plunger 212 is guided by the step 132. In other words, the plunger 212 is displaceably received in the portion of the opening 130 that is narrowed by the step 132. The plunger 212 has an operating surface 214 which faces the reaction element 114. The operating surface 214 has a protruding portion 216 which, on operation of the power transmission device 200, first comes into contact with the reaction element 114 in order to operate the first cylinder-piston device 102 for hydraulic pressure generation. The power transmission device 200 is received together with the brake booster piston 104 in the first cylinder 106.

The brake power generating apparatus 1000 further comprises a sensor arrangement 600. The sensor arrangement 600 is composed of two sensors 602 and 604, which are preferably in the form of displacement sensors. The sensor 602 is arranged on the piston 206. The sensor 604 is provided on a cylinder bottom 218 of the first cylinder 106 facing the brake pedal 204. By means of the sensors 602 and 604, a relative displacement of the sensor 602 on the piston 206, which is coupled with the brake pedal 204 via the power input member 202, relative to the sensor 604 on the cylinder bottom 218 can be detected. The sensor 604 is thus a stationary sensor. On the basis of the amount of relative displacement between the two sensors 602 and 604, the size of the power exerted by a driver on the brake pedal 204 is determined. The measured values detected by the sensors 602 and 604 are used to determine the necessary brake boosting. The measured values of the two sensors 602 and 604 accordingly indicate how great the boosting power to be generated by the brake booster device 300 must be.

The brake booster device 300 comprises a second cylinder-piston device 302 and an electromechanical actuator 304. The second cylinder-piston device 302 comprises a second piston 308 which is displaceably received in a third cylinder 306. The second piston 308 is coupled with the electromechanical actuator 304 via a coupling portion 310. The second piston 308 further defines a hydraulic chamber 312 with its end face remote from the electromechanical actuator 304, together with the cylinder 306. The hydraulic chamber 312 is in direct fluid contact with the first hydraulic chamber 122 in the first cylinder 106 via the fluid path 314.

The brake booster device 300 is not directly fluidly connected to either of the brake circuits 400, 500 of the brake system BA. The second cylinder-piston device 304 is designed to operate the brake booster piston 104 and thus also the first cylinder-piston device 102 hydraulically, or to apply a higher hydraulic pressure thereto, during braking operation.

The electromechanical actuator 304 comprises an electric motor 316 and a ball screw 318 coupled with the electric motor 316, which ball screw serves as a gear mechanism. The ball screw 318 has a spindle 320 and a nut 322 which are coupled together via a ball arrangement. A rotor (not shown) of the electric motor 316 is coupled with the nut 322 for conjoint rotation in order to set it in rotation. A rotary movement of the nut 322 is transmitted to the spindle 320 in such a manner that the spindle 320 is displaced axially. The end face of the spindle 320 on the left in the figure is mechanically coupled with the second piston 308. An axial displacement of the spindle 320 is thus transmitted directly to the second piston 308, whereby the second piston is displaced in the second cylinder 306 along the cylinder 306.

The electric motor 316 is provided with a sensor unit 324 with which the position of the motor 316 can be detected. The position of the second piston 308 can be determined on the basis of the position of the motor 316.

A brake power generating operation with the brake power generating apparatus 1000 is as follows: The driver of the vehicle operates the brake pedal 204. The piston 206 of the power transmission device 200 is displaced to the left in FIG. 1 via the power input member 202, with compression of the spring element 210. A relative movement of the power transmission device 200 relative to the brake cylinder device 100 takes place. The piston 206 of the power transmission device 200 is thereby displaced, together with the sensor 602 attached thereto, relative to the sensor 604 on the cylinder bottom 214 (to the left in FIG. 1). The amount of this relative displacement between the sensors 602 and 604 is used to determine the necessary brake boosting. The measured values detected by the sensors 602, 604 are outputted to the ECU, which uses them to determine the hydraulic pressure necessary for the brake boosting. The necessary boosting is thus readjusted by the ECU via the brake booster device 300. If the necessary boosting, or the necessary hydraulic pressure, has been determined by the ECU, the brake booster device 300 is controlled, that is to say the electromechanical actuator 304 is controlled, in order to generate in the second cylinder-piston device 302 the hydraulic pressure necessary for the brake boosting.

During the relative movement described above, the plunger 212 comes into contact with the reaction element 114. The protruding portion 216 of the operating surface 214 of the plunger 212 dips relatively quickly into the reaction element 114. Since the protruding portion 216 penetrates the reaction element 114 relatively quickly, the first cylinder-piston device 102 is operated via the coupling element 112 coupled with the reaction element 114. The reaction element 114 and the coupling element 112 coupled therewith displace the primary piston 116, albeit slightly, against the spring power of the spring element 108 to the left, so that the hydraulic chambers 124 and 122 are compressed, that is to say in addition to the primary piston 116, the secondary piston 120 is also displaced to the left in FIG. 1. The pressure in the hydraulic chambers 124, 126 and thus in the brake circuits 400, 500 increases. This initial operation of the brake power generating apparatus 1000 is initiated directly by the power exerted by the driver on the brake pedal 204, at least some of which is transmitted directly to the reaction element 114.

The dipping of the plunger 212 into the material of the reaction element 114 also allows the sensors 602 and 604 to detect the amount of relative movement between the piston 208 and the brake booster piston 104, before the spring element 108 responds. The brake power required by the driver can thereby be detected, and the necessary brake boosting can be determined, or requested, exactly.

During the operating phase described above, the reaction element 114 also performs a relative movement relative to the brake booster piston 104. Owing to this relative movement, a gap can be formed between the reaction element 114 and the opening 130, or the step 132, of the brake booster piston 104.

The necessary boosting pressure is generated as follows: The second piston 308 is operated via the electromechanical actuator 304. The piston 308 moves to the left in FIG. 1, and the operating power applied by the actuator 304 is transmitted to the hydraulic fluid in the hydraulic chamber 312. A hydraulic pressure is thereby generated in the hydraulic chamber 312 which corresponds to the control commands of the ECU based on the measured values of the sensors 602 and 604. Since the hydraulic chambers 122, 312 and the fluid path connecting the two hydraulic chambers 122, 312 are completely filled with hydraulic fluid at all times and hydraulic fluid is not compressible, the operating pressure built up in the chamber 312 is transmitted completely via the first hydraulic chamber 122 to the brake booster piston 104 without a pressure drop and without a time delay. Accordingly, the hydraulic pressure generated in the second cylinder-piston device 302 is present at the brake booster piston 104 as operating pressure for the brake booster piston 104.

The built-up operating pressure leads in FIG. 1 to a displacement of the brake booster piston 104 to the left. As a result of the displacement of the brake booster piston 104 towards the first cylinder-piston device 102, the gap between the reaction element 114 and the step 132 of the brake booster piston 104 is closed. The brake booster piston 104 thus comes into contact with the bearing element 110 and the reaction element 114 again and exerts the boosting pressure generated by the second cylinder-piston device 302 on the first cylinder-piston device 102 via the reaction element 114 and the coupling element 122, with compression of the spring element 108. From this point in time onwards, the brake booster piston 104 moves together with the primary piston 116 of the first cylinder-piston device 102 as a unit to the left in FIG. 1, until there has become established in the hydraulic chambers 124, 126 fluidly coupled with the wheel brakes 402, 404, 502, 504 a hydraulic pressure which corresponds to the boosting pressure in the first hydraulic chamber 122 or in the hydraulic chamber 312 of the second cylinder-piston device 302.

Conversely, in the case of a return stroke of the second piston 308, the operating pressure in the hydraulic chamber 312 falls, so that hydraulic fluid is able to flow from the first hydraulic chamber 122 in the first cylinder 106 via the fluid path 314 back into the hydraulic chamber 312 of the second cylinder-piston device 302 again. In this case, the brake booster piston 104, the bearing element 110, the coupling element 112 and the reaction element 114 can be moved back into their starting position via the spring element 108. Furthermore, the primary piston 116 of the first cylinder-piston device 102 can be displaced back into its starting position on account of a hydraulic pressure (residual pressure) that is still present in the brake circuits 400, 500 or on account of the spring power of the spring devices.

Valve groups 408 and 508 are provided in the brake circuits 400 and 500. Some valves 410, 510 of the valve groups 408 and 508 control the inflow of the hydraulic fluid to the wheel brakes 402, 404, 502, 504 and to that end are provided in the fluid paths 406 and 506 which are able to guide the hydraulic fluid from the first cylinder-piston device 102 to one or more of the wheel brakes 402, 404, 502, 504. Furthermore, some of the valves 412, 512 of the valve groups 408 and 508 are provided in return lines 414, 514. These valves control the outward flow of the hydraulic fluid into a hydraulic reservoir. The valves 412, 512, 414, 514 are electrically operable.

Figure 2:
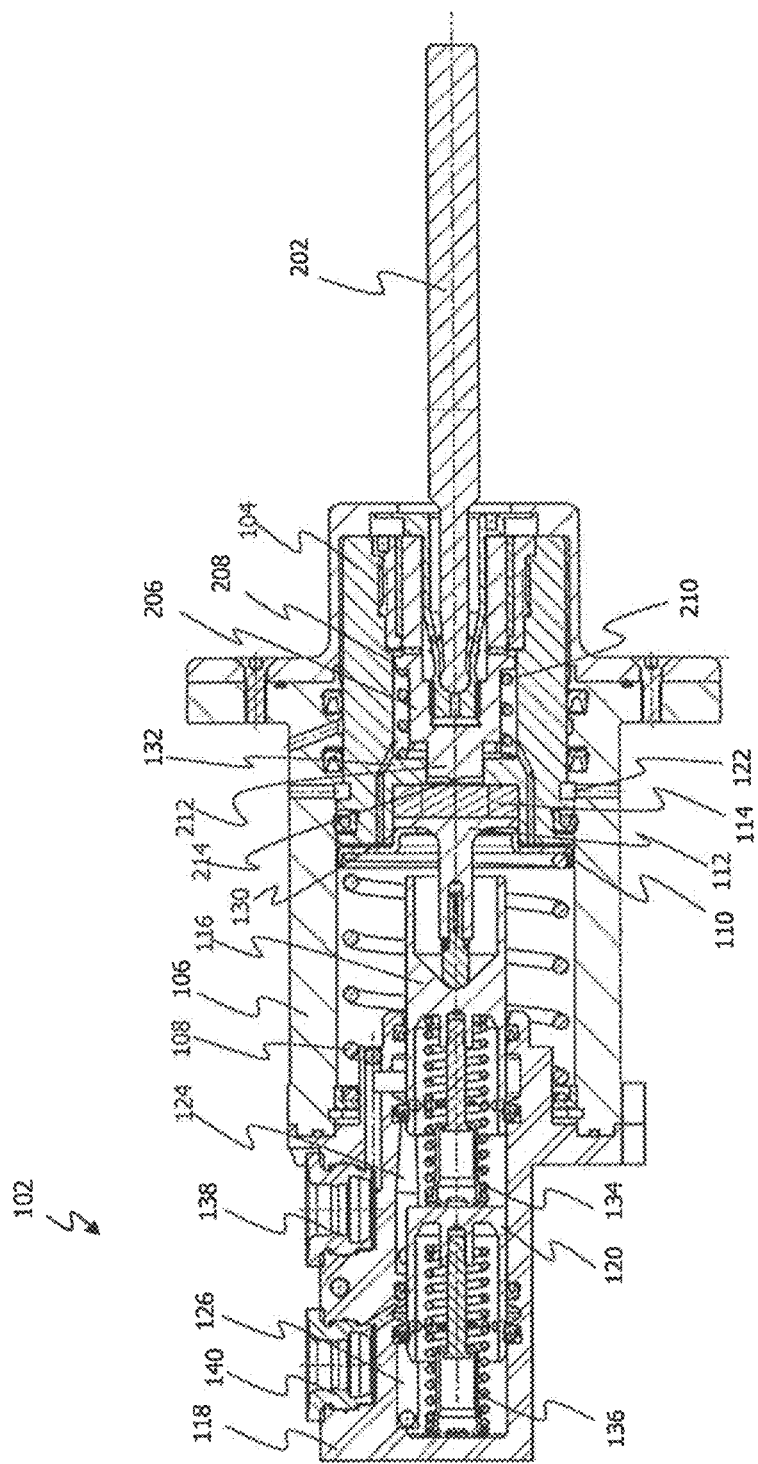
FIG. 2 is a sectional view of the brake cylinder device and the power transmission device of the proposed brake power generating apparatus, wherein the power transmission device is coupled with the brake cylinder device.

FIG. 2 is a sectional view through the brake cylinder device 100 and the power transmission device coupled therewith.

The first cylinder-piston device 102 comprises the primary piston 116 and the secondary piston 120, which are displaceably received in the cylinder 118. The primary piston 116 is biased into its starting position by a spring element 134. The same is true of the secondary piston 120, which is biased into its starting position by a further spring element 136. A connection 138 for the first brake circuit 400 is provided in the hydraulic chamber 124. The hydraulic chamber 126 has a connection 140 for the second brake circuit 500. The second cylinder 118 is connected to the first cylinder 106. A portion of the primary piston 116 is received in the first cylinder 106. In addition to the primary piston 116, a portion of the brake booster piston 104, the reaction element 114, the coupling element 112, the bearing element 110 and the spring element 108 is also received in the second cylinder 118.

The spring element 108 biases the reaction element 114, the coupling element 112 and the brake booster piston 104 into their starting positions. The brake booster piston 104 has a through-opening 130. The opening 130 extends through the brake booster piston 104 and serves to receive the power transmission device 200. The opening 130 of the brake booster piston 104 has a step 132, on which the power transmission device 200 is able to bear via the spring 210. In the starting state of the brake cylinder device 100, or the power transmission device 200, the bearing element 110 rests on account of the biasing power of the spring element 108 on the brake booster piston 104 and presses the coupling element 112 and the reaction element 114 in the opening 130 against the step 132. The step 132 narrows the diameter of the opening 130. The piston 206 is guided in the opening 130. The piston 206 comprises a plunger portion 212 which has an operating surface 214 with a protruding portion 216. The piston 206 is biased into its starting position by a spring element 210. The spring element 210 extends between the shoulder 208 and the step 132. The piston 206 receives a portion of a the power input member 202 coupled with the brake pedal 204.

Figure 3:
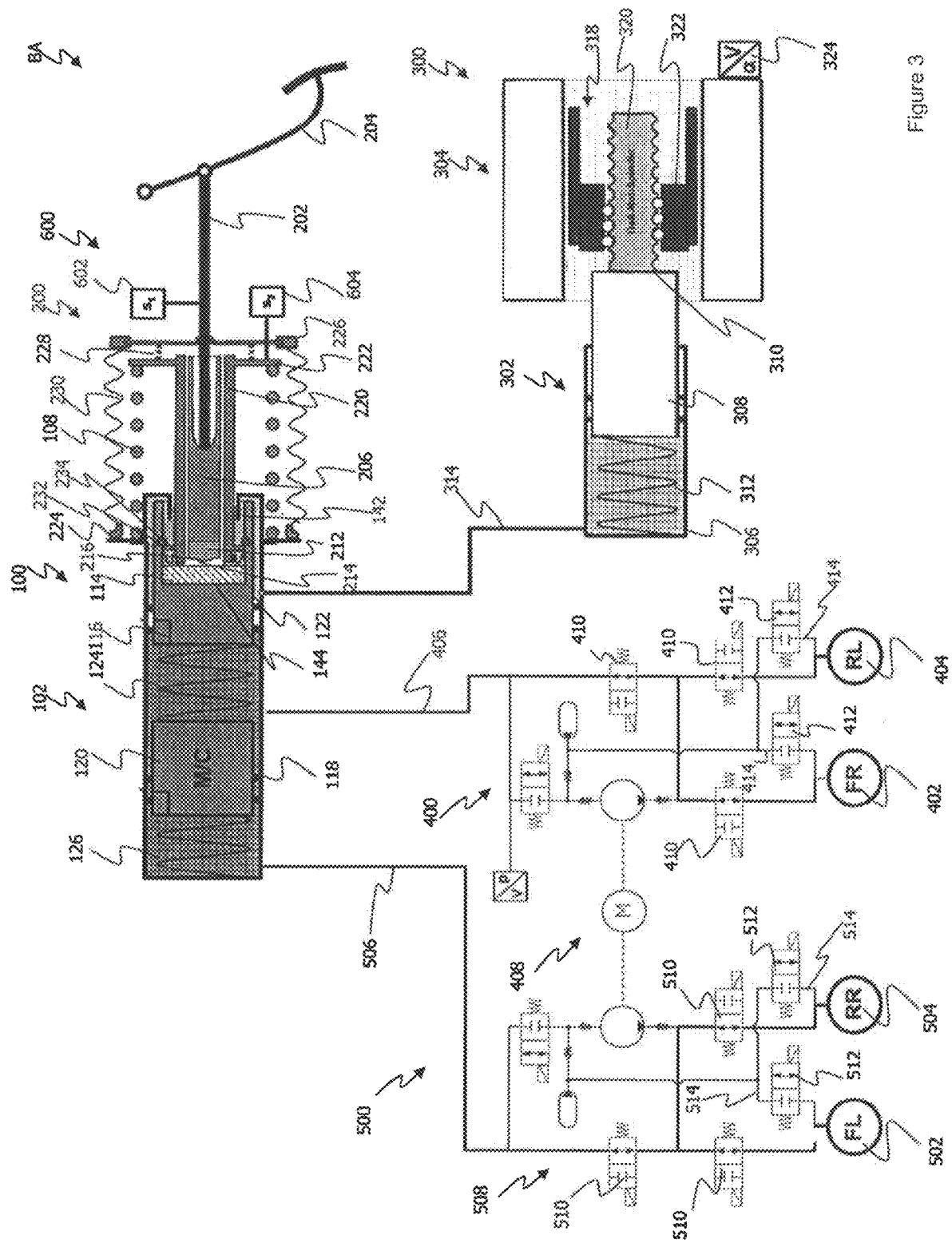
FIG. 3 shows a second exemplary embodiment of the proposed brake power generating apparatus installed in a brake system.

FIG. 3 shows a second exemplary embodiment of the brake power generating apparatus 1000. For features which are the same or have the same effect, the same reference numerals as in the first exemplary embodiment are used.

The brake power generating apparatus 1000 according to the second embodiment comprises a brake cylinder device 100, a power transmission device 200, and a brake booster device 300. The brake cylinder device 100 is fluidly coupled with two brake circuits 400 and 500. The brake power generating apparatus 1000 according to the second exemplary embodiment further has an ECU.

The first cylinder-piston device 102 comprises a primary piston 116 which is displaceably received in a cylinder 118, and a secondary piston which is displaceably received in the cylinder 118. The two pistons 116, 120 can each be coupled with a spring device, which spring devices return the two pistons 116, 120 to their starting positions in the unoperated state.

The primary piston 116 and the secondary piston 120 are arranged one behind the other in the cylinder 118 and define three hydraulic chambers 122, 124, 126 in the cylinder 118. A first hydraulic chamber 122 is defined by an end face of the primary piston 116 facing away from the operating direction for hydraulic pressure generation and a first cylinder bottom facing the rear side of the primary piston 116. A second hydraulic chamber 124 is defined by an end face of the primary piston 116 facing in the operating direction for hydraulic pressure generation and by an end face of the secondary piston 120 opposite to the operating direction for hydraulic pressure generation. Furthermore, a third hydraulic chamber 126 is defined by an end face of the secondary piston 120 facing in the operating direction for hydraulic pressure generation and a second cylinder bottom.

The second hydraulic chamber 124 is fluidly coupled with the first brake circuit 400 and the third hydraulic chamber 126 is fluidly coupled with the second brake circuit 500. Furthermore, the second hydraulic chamber 124 and the third hydraulic chamber 126 are fluidly connected in a known manner to an unpressurized hydraulic fluid reservoir.

The primary piston 116 has a recess 142, so that it is U-shaped in cross-section. The reaction element 114, which covers the bottom 144 of the recess 142, is received in the recess 142. Furthermore, at least a portion of the power transmission device 200 is also received in the recess 142.

The power transmission device 200 has a power input member 202 which is coupled with the brake pedal 204. The power input member 202 is connected to a piston 206. The plunger 212 is provided on the piston 206. The piston 206 is guided together with its plunger 212 in a cylinder 220 which extends in the recess 142 of the piston 116 as far as the reaction element 114. The cylinder 220 has a flange 232 which is held in the recess 142 via a holding element 234. Accordingly, the piston 116 can be moved together with the cylinder 220, or the power transmission device 200. A bearing flange 222 is formed on the cylinder 200, on which bearing flange a spring element 108 bears. The spring element 108 further also bears on a bearing flange 224 which is provided on the cylinder 118. The spring element 108 provides a pedal restoring power and biases the power transmission device 200 into its starting position.

The power transmission device 200 comprises an operating element 226 which is biased into its starting position by a spring element 228. The operating element 226 is attached to the power input member 202. The spring element 228 extends between the bearing flange 222 of the cylinder 220 and the operating element 226.

A concertina-type cover 230 further extends between the operating element 226 and the bearing flange 224 on the cylinder 220. The concertina-type cover 230 and the portions of the power transmission device 200 and of the brake cylinder device 100 that are enclosed by the concertina-type cover 230 are situated in the passenger compartment when the brake power generating apparatus 1000 is mounted in a vehicle.

The brake power generating apparatus 1000 according to the second embodiment has a sensor arrangement 600 having sensors 602 and 604. According to the second embodiment, the sensor 602 is attached to the power transmission element 202. The second sensor 604 is attached to the bearing flange 222. Both sensors 602 and 604 can be in the form of displacement sensors.

The brake power booster 300 according to the second embodiment is of identical construction to the first embodiment. For details of the structure and function of the brake booster device 300, reference is made, in order to avoid repetition, to the description of the first embodiment.

The brake booster device 300 has the second cylinder-piston device 302 and the actuator 304. In the second cylinder-piston device 302 there is defined a hydraulic chamber 312 which is connected to the first hydraulic chamber 122 via the fluid path 314. The first hydraulic chamber 122 is located in the first cylinder-piston device 102. A hydraulic pressure is generated in the hydraulic chamber 312 of the cylinder-piston device 302 via the piston 308.

A brake power generating operation with the brake power generating apparatus 1000 according to the second exemplary embodiment is as follows: On operation of the brake pedal 204, the power transmission device 200 is moved relative to the brake cylinder device 100. The operating element 226 is displaced towards the bearing flange 222 on the cylinder 220. The spring element 228 is thereby compressed. Since the spring element 228 provides a lower spring power than does the spring element 108, there is at first no displacement of the cylinder 218 against the spring power of the spring element 108. Only when the operating element 226 is bearing on the bearing flange 222 and the spring element 228 is compressed is the cylinder 220 displaced. With the relative movement of the operating element 226 relative to the bearing flange 222, the sensor 602 on the power input member 202 is moved relative to the sensor 604 on the bearing flange 222 (to the left in FIG. 3). On the basis of this relative movement between the sensors 602 and 604, which determines the brake power requested by the driver, the necessary brake boosting can be determined.

As a result of the above-described relative movement, the piston 208 is displaced with the plunger 212 towards the reaction element 114. To that end, the plunger 212 has an operating surface 214 with a protruding portion 216 which is able to dip into the reaction element 114. Since the plunger 212 is able to penetrate the material of the reaction element, the sensors 602 and 604 are able to detect the amount of relative movement between the operating element 226, or the power input member 202, and the bearing flange, before the spring element 108 responds and the brake cylinder device 100 can be operated.

After the operating element 224 has come to bear on the cylinder 220 with the bearing flange 222, that is to say the spring element 228 is compressed completely, the cylinder 220 together with the operating element 226 and the primary piston 116 is displaced to the left in FIG. 3. The spring element 108 is thereby compressed and a hydraulic pressure is generated in the first cylinder-piston device 102. The spring element 108 is intended to convey a good pedal feel to the driver operating the brake pedal 204. The spring element 108 thus provides a restoring power which acts against the operation of the brake pedal.

Using the measured values detected by the sensor arrangement 600, the ECU is able to determine the necessary brake boosting. The ECU then controls the brake boost device 300. The electromechanical actuator 304 is controlled by the ECU in order to generate in the second cylinder-piston device 302 the necessary hydraulic pressure for brake boosting. Since the hydraulic chamber 312 is fluidly coupled via the fluid path 314 with the first chamber 122 of the first cylinder-piston device 102, the hydraulic pressure built up in the hydraulic chamber 312 is transmitted to the first chamber 122. The hydraulic pressure generated in the hydraulic chamber 312 is also present via the fluid path 314 at the first hydraulic chamber 122 of the first cylinder-piston device 102. The hydraulic fluid displaced from the hydraulic chamber 312 displaces the primary piston 116 directly to the left in FIG. 3. The hydraulic chambers 124 and 126 are thereby compressed, and hydraulic fluid continues to be applied to the brake circuits 400 and 500, or one or more wheel brakes 402, 404, 502, 504.

The above-described exemplary embodiments and the structural and operational aspects thereof serve merely for better understanding of the structure, the functioning and the properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described variants. Combinations between all the individual implementations in the text, that is to say in every section of the description, in the claims, and also combinations between different variants in the text, in the claims and in the figures, are also included. The claims also do not limit the disclosure and thus the possible combinations of all the indicated features with one another. All the disclosed features are explicitly also disclosed herein individually and in combination with all the other features.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electrohydraulic brake power generating apparatus for an electrohydraulic motor vehicle brake system, comprising:
   a power transmission device which is coupled with a brake pedal,
   a brake cylinder device to be operated by the power transmission device, wherein the brake cylinder device comprises a first cylinder-piston device, with the first cylinder-piston device to be fluidly coupled with at least one brake circuit, and
   a brake booster device which comprises a second cylinder-piston device and at least one electromechanical actuator, wherein the brake booster device is adapted to apply a hydraulic pressure on the brake cylinder device for brake boosting,
   wherein the power transmission device is adapted to operate the brake cylinder device by means of a relative movement in each operating condition of the brake power generating apparatus regardless of whether the brake power generating apparatus is operating in normal operation or in an emergency operation in which the brake booster is inoperable, wherein the brake cylinder device has at least one reaction element which comes into contact with the at least one power transmission device for operation of the brake cylinder device, wherein the first cylinder-piston device has at least one piston which is to be coupled with the power transmission device, and wherein the at least one reaction element is provided on the piston of the first cylinder-piston device.

2. The electrohydraulic brake power generating apparatus as claimed in claim 1, wherein the power transmission device and the first cylinder-piston device are to be coupled in such a manner that at least some of the power exerted on the power transmission device via the brake pedal can be transmitted to the first cylinder-piston device in each operating condition.

3. The electrohydraulic brake power generating apparatus as claimed in claim 1, wherein the piston of the first cylinder-piston device is so designed that it receives the at least one reaction element and at least a portion of the at least one power transmission device.

4. The electrohydraulic brake power generating apparatus as claimed in claim 1, wherein the brake cylinder device has a brake booster piston which is to be fluidly coupled with the brake booster device.

5. The electrohydraulic brake power generating apparatus as claimed in claim 4, wherein the brake booster piston is adapted to transmit a boosting power generated by the brake booster device to the first cylinder-piston device.

6. The electrohydraulic brake power generating apparatus as claimed in claim 1, wherein the brake cylinder unit has a first bearing flange and the power transmission device has at least a second hearing flange, wherein at least one spring element for biasing the power transmission device into its starting position extends between the first and second bearing flanges.

7. The electrohydraulic brake power generating apparatus as claimed in claim 1, wherein the brake power generating apparatus has at least one sensor arrangement which is at least adapted to enable the necessary boosting for the brake power exerted on the brake pedal to be determined.

8. The electrohydraulic brake power generating apparatus as claimed in claim 7, wherein the at least one sensor arrangement is to be coupled directly with at least one control unit of the brake power generating apparatus.

9. An electrohydraulic motor vehicle brake system having an electrohydraulic brake power generating apparatus as claimed in claim 1.

10. An electrohydraulic brake power generating apparatus for an electrohydraulic motor vehicle brake system, comprising:

a power transmission device which is coupled with a brake pedal, a brake cylinder device to be operated by the power transmission device, wherein the brake cylinder device comprises a first cylinder-piston device, with the first cylinder-piston device to be fluidly coupled with at least one brake circuit, and a brake booster device which comprises a second cylinder-piston device and at least one electromechanical actuator, wherein the brake booster device is adapted to apply a hydraulic pressure on the brake cylinder device for brake boosting, wherein the power transmission device is adapted to operate the brake cylinder device by means of a relative movement in each operating condition of the brake power generating apparatus regardless of whether the brake power generating apparatus is operating in normal operation or in an emergency operation in which the brake booster is inoperable, wherein the brake cylinder device has a brake booster piston which is to be fluidly coupled with the brake booster device, wherein the brake booster piston receives at least a portion of the power transmission device, in such a manner that a relative movement between the power transmission device and the brake booster piston is possible.

11. A method for operating an electrohydraulic brake power generating apparatus, wherein the electrohydraulic brake power generating apparatus comprises:

a power transmission device which is coupled with a brake pedal, a brake cylinder device to be operated by the power transmission device, wherein the brake cylinder device comprises a first cylinder-piston device, with the first cylinder-piston device to be fluidly coupled with at least one brake circuit, a brake booster device which comprises a second cylinder-piston device and at least one electromechanical actuator, wherein the brake booster device is adapted to apply a hydraulic pressure on the brake cylinder device for brake boosting, wherein the brake cylinder device has a brake booster piston which is to be fluidly coupled with the brake booster device, wherein the brake booster piston receives at least a portion of the power transmission device, in such a manner that a relative movement between the power transmission device and the brake booster piston is possible, wherein the power transmission device is adapted to operate the first cylinder-piston device by means of a relative movement relative to the brake cylinder device in each operating condition of the brake power generating apparatus, wherein the method comprises the following step:

operating the brake cylinder device by means of a relative movement between the power transmission device and the brake cylinder device, wherein the operation of the brake cylinder device takes place by means of the relative movement between the power transmission device and the brake cylinder device in each operating condition of the brake power generating apparatus regardless of whether the brake power generating apparatus is operating in normal operation or in an emergency operation in which the brake booster is inoperable.

12. The method as claimed in claim 11, wherein the method comprises the further steps:

detecting parameters which are suitable for determining the brake boosting, generating a hydraulic pressure for brake boosting on the basis of the detected parameters by means of the brake booster device, and boosting the hydraulic pressure prevailing in the first cylinder-piston device by the hydraulic pressure provided by the brake booster device.

\* \* \* \* \*